(12) United States Patent
Krueger et al.

(10) Patent No.: US 8,782,788 B2
(45) Date of Patent: Jul. 15, 2014

(54) SYSTEMS, METHODS, AND APPARATUS FOR IMPROVED APPLICATION SECURITY

(71) Applicant: Lonocloud, Inc., La Jolla, CA (US)

(72) Inventors: Ingolf Krueger, San Diego, CA (US); Hossein Eslambolchi, Rancho Santa Fe, CA (US); Markus Kaltenbach, San Jose, CA (US)

(73) Assignee: Lonocloud, Inc., La Jolla, CA (US)

( * ) Notice: Subject to any disclaimer, the term of this patent is extended or adjusted under 35 U.S.C. 154(b) by 0 days.

(21) Appl. No.: 13/645,351

(22) Filed: Oct. 4, 2012

(65) Prior Publication Data

US 2014/0007236 A1 Jan. 2, 2014

Related U.S. Application Data

(60) Provisional application No. 61/665,747, filed on Jun. 28, 2012.

(51) Int. Cl.
*H04L 29/06* (2006.01)

(52) U.S. Cl.
USPC .................................. 726/23; 726/11; 726/22

(58) Field of Classification Search
USPC ............................................... 726/11, 22, 23
See application file for complete search history.

(56) References Cited

U.S. PATENT DOCUMENTS

| 7,926,104 | B1 * | 4/2011 | Sundaram et al. | 726/22 |
| 8,234,705 | B1 * | 7/2012 | Roskind et al. | 726/22 |
| 2003/0037142 | A1 * | 2/2003 | Munger et al. | 709/225 |
| 2010/0088150 | A1 | 4/2010 | Mazhar et al. | |
| 2010/0131649 | A1 | 5/2010 | Ferris | |
| 2011/0153727 | A1 | 6/2011 | Hong | |
| 2011/0231477 | A1 | 9/2011 | Ido et al. | |

OTHER PUBLICATIONS

Zissis, Dimitrios, and Dimitrios Lekkas. "Addressing cloud computing security issues." Future Generation Computer Systems 28.3 (2012): 583-592.*

* cited by examiner

*Primary Examiner* — Kambiz Zand
*Assistant Examiner* — Michael Guirguis
(74) *Attorney, Agent, or Firm* — Knobbe Martens Olson & Bear, LLP

(57) ABSTRACT

A secure computing system includes a plurality of application nodes, each node including a device address, a platform address, and a node ID. A mapping is maintained between each of the node IDs and the platform addresses. A mapping is also maintained between each of the platform addresses and the device addresses. An analyzer analyzes communication to application nodes to detect a predetermined event. In response to the detection of an event, a reconfigurator may change a platform address of one or more of the application nodes. The mappings of addresses are updated in response to the change. A consensus state maintainer may ensure that application nodes communicating with each other are provided with the updated mapping. By changing the platform addresses of the application nodes, an ability of an external threat to communicate with the application nodes may be reduced.

25 Claims, 8 Drawing Sheets

SYSTEMS, METHODS, AND APPARATUS FOR IMPROVED APPLICATION SECURITY

CROSS-REFERENCE TO RELATED APPLICATIONS

This application claims priority to U.S. Provisional Application No. 61/665,747 filed on Jun. 28, 2012 entitled SYSTEMS, METHODS, AND APPARATUS FOR IMPROVED APPLICATION SECURITY, the contents of which are hereby incorporated by reference in their entirety.

BACKGROUND

Cloud computing offers advantages over traditional hosted computing infrastructure in some environments. For example, cloud computing may offer improved flexibility through the use of on-demand, pay as you go deployment models that allow a computing infrastructure to be sized appropriately for current business needs. Cloud computing may also provide for reduced capital expenditures and operational overhead when compared to traditional hosted solutions.

While cloud computing offers some advantages over a traditional hosted model, it also presents some challenges. For example, the flexibility provided by cloud computing's ability to dynamically scale an application infrastructure may limit the ability to control security access rules for each of the nodes in the infrastructure. For example, because nodes performing infrastructure functions may not be statically known to an application architect, it may be difficult to define firewall or VLAN rule sets that partition access to those nodes based on a fixed security model.

For example, in a traditional hosted infrastructure model employing dedicated computing resources, infrastructure owners may have complete control of the security model employed by the infrastructure. For example, a security model may be defined that provides for public or untrusted access to some predefined computing resources. Other computing resources within the infrastructure that do not need to be accessible to untrusted nodes may be placed in a "DMZ," a euphemism for "demilitarized zone." Untrusted nodes have no access to computing resources within a DMZ, thus increasing the security of those nodes. With a cloud based infrastructure, the dynamic nature of nodes included in the infrastructure may prevent the effective deployment of a DMZ architecture. Therefore, alternative security architectures for cloud computing deployments are needed.

SUMMARY

One embodiment includes a secure distributed computing platform comprising a collection of application nodes, which are individually addressable, and can communicate among each other via their addresses. An address mapping is maintained by the platform to indirectly map the individual addresses of each node, referred to as a node ID to a device address via an intermediate platform address. Security is achieved by means of proactive, or reactive, or both proactive and reactive, dynamic reconfiguration of the address-mapping such that the address-node mapping and its reconfiguration is both transparent to the application and not persistently exploitable by an attacker. In this embodiment, the secure computing system may provide for dynamic reconfiguration of the address-node mapping. When the mapping is reconfigured, a first platform address map may be exchanged for a second platform address. When this is performed, a node ID previously mapped to the first platform address may be remapped to the second platform address. Similarly, a device address previously mapped to the first platform address may be remapped to the second platform address.

In some embodiments, the dynamic reconfiguration is proactive and can change continually during operation of the system. In other embodiments, the dynamic reconfiguration is a reactive change triggered by alerts received from an application analyzer that is monitoring the system for predetermined events. In this embodiment, the application analyzer may monitor application states, detect attack patterns, or flag application activities as suspicious or worthy of further analysis or isolation, or any combinations thereof.

In other embodiments, the system can reset individual application nodes to previously recorded good states or duplicate nodes for additional analysis or monitoring. The system may also spawn new nodes to replace or augment current application functionality, or any combinations thereof.

Another embodiment is a method in a secure computing system of reducing the vulnerability of an application node to attack, wherein the node has a platform address and a device address. This method includes mapping a device address corresponding to a first application node to a first platform address; detecting a predetermined event within the secure computing system; and in response to the detected event, remapping the device address corresponding to the first application node to a second platform address to prevent unauthorized users from accessing the first application node.

Yet another embodiment is a secure computing system that includes a plurality of nodes running applications, wherein each node has a device address and a platform address; one or more address tables configured to store a mapping of the platform address and device address of each node in the system; and a reconfigurator module capable of changing the platform address for one or more nodes in response to a predetermined event in order to prevent access to the node from computing devices outside of the secure computing system.

Still another embodiment includes a secure computing apparatus for reducing the vulnerability of a plurality of application nodes to attack, wherein each node has a platform address and a device address. This embodiment includes means for mapping a device address corresponding to a first application node to a first platform address; means for detecting a predetermined event within the secure computing system; and means for remapping the device address corresponding to the first application node to a second platform address in response to the detected event in order to prevent access to the node from computing devices outside of the secure computing system.

One additional embodiment is a non-transitory, computer readable medium comprising instructions that when executed cause a processor to perform the method of: mapping a device address corresponding to a first application node to a first platform address; detecting a predetermined event within a secure computing system; and in response to the detected event, remapping the device address corresponding to the first application node to a second platform address.

DETAILED DESCRIPTION

Figure 1A:
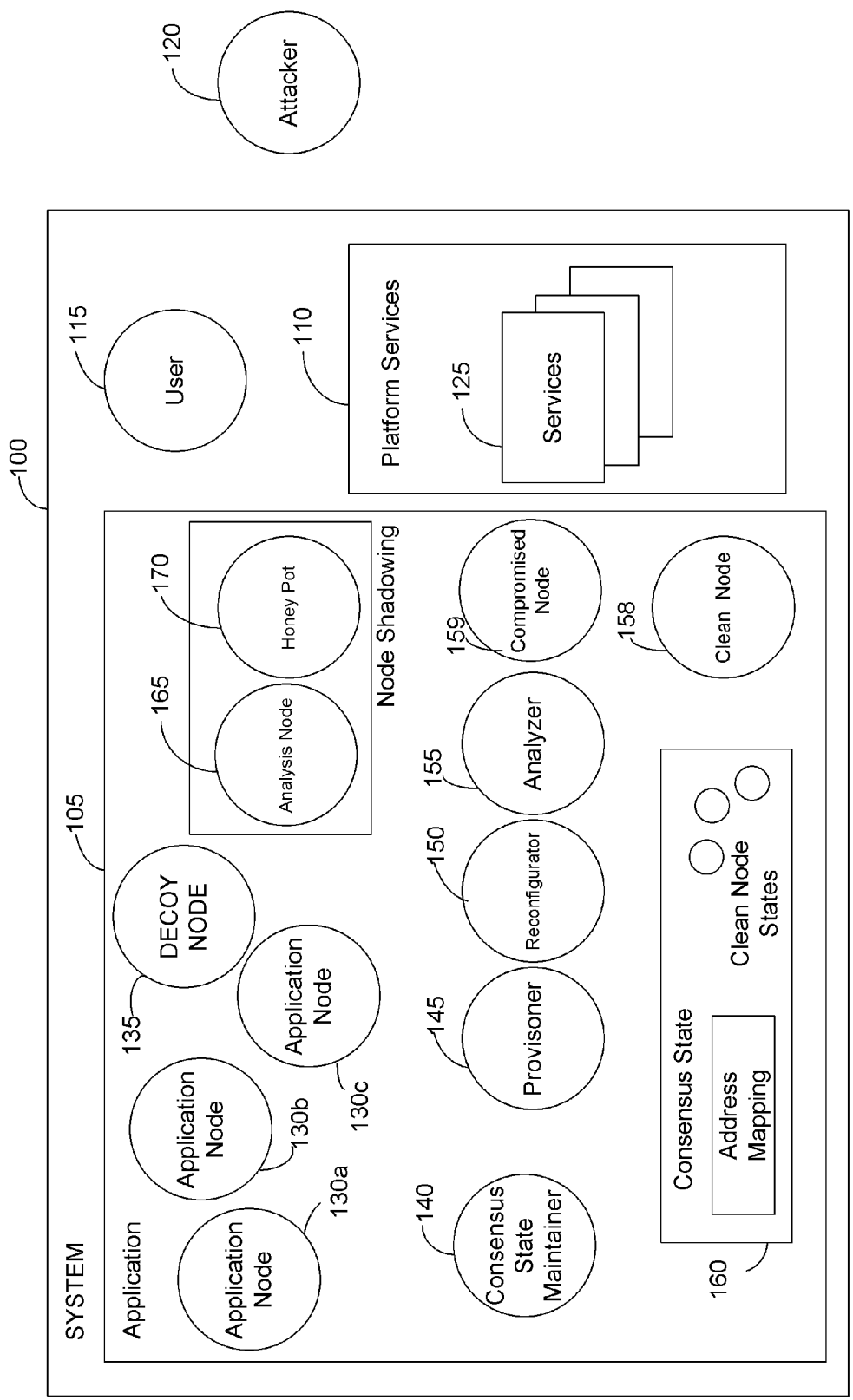
FIG. 1A is a system block diagram of a system implementing at least one of the disclosed embodiments.

Embodiments of the invention relate to systems, methods, and apparatus for improving the security of computer networks and applications deployed in cloud systems. More particularly, embodiments relate to improving the security of cloud application computing resources deployed in a computing environment by protecting some systems within the network from unauthorized attackers. In one aspect, the security of the computing resources is improved by providing a system that allows for dynamic addressing of nodes forming a cloud application. The addresses of nodes in a cloud application may be dynamically changed while connectivity to the nodes by other nodes within the cloud application is maintained. The dynamic nature of the node addresses may make it more difficult for an attacker to sustain connectivity with nodes in the cloud application.

The administration of dynamic addresses for nodes in a cloud application may be part of a larger computing resource management system or platform that manages a mesh, herd, or cluster of nodes in a computing environment. The platform may provide for reconfiguration of the mesh under a variety of events. For example, if the platform detects that the current number of nodes in the mesh is insufficient or excessive relative to the computing needs, the platform may increase or decrease the number of nodes in the mesh to tailor the size of the mesh to the current computing requirements. The platform may also start new nodes in response to the malfunction or failure of one or more nodes. The mesh may also be reconfigured when one or more nodes within the mesh detect issues or patterns of communication that suggest either that a node has malfunctioned or that a node or the mesh is under attack or has been compromised by an outside actor.

In some circumstances, nodes may be placed in a quarantine state. Quarantined nodes can either be isolated, brought down, and started up again in a clean state, or can be temporarily replaced or shadowed by analysis nodes that may examine traffic patterns, message contents, or communication metrics for fingerprints of known attacks. Analysis nodes may also monitor network traffic to the quarantined nodes to obtain additional data on malicious activity and possibly to classify and recognize new attack patterns. In an embodiment, the mesh functionality may provide for a failover capability that enables nodes in the mesh to replace other nodes when they fail for any number of reasons.

Definitions

Unless otherwise defined, all technical and scientific terms used herein have the same meaning as commonly understood by one of ordinary skill in the art to which this invention belongs.

As used in this specification and the appended claims, the singular forms "a," "an," and "the" include plural references unless the context clearly dictates otherwise. Any reference to "or" herein is intended to encompass "and/or" unless otherwise stated.

As used herein, a "cloud provider" is an entity offering the static or dynamic provisioning of computational, networking, or storage resources. This encompasses commercial providers such as Amazon AWS and Rackspace, but also more specialized cases where a domain of authority (individual or organization) grants access to a computational resource such as a private data center, public data center, a hybrid of private and public data center, individual servers, server grids, mobile phones, smart phones, sensors, actuators, sensor/actuator combinations, tablet computers, electronic control units, set-top-boxes, and displays.

As used herein, "cloud infrastructure" refers to private clouds, public clouds, hybrid clouds, the fringes of private clouds, the fringes of public clouds, the fringes of hybrid clouds, and combinations thereof.

As used herein, the "fringes" of the cloud are computational, networking and data resources outside of traditional cloud execution environments such as public, private or hybrid data centers; specifically, we define individual servers, server grids, mobile phones, smart phones, sensors, actuators, sensor/actuator combinations, laptop computers, tablet computers, electronic control units, set-top-boxes, and displays to be elements of the fringes of the cloud.

As used herein, a "node" is a unit onto which software programs are deployed; nodes can be a physical appliance/server or a virtual server on top of other physical hardware; a node can be identified by platform or application addresses; nodes may maintain a mapping between platform and application addresses.

As used herein, an "attacker" is an individual or system attempting to intrude into an application or platform (or any combination thereof), for the purpose of exploiting the application or platform. Attack activities may include packet sniffing and analysis, packet insertion, or gaining access and permission to execute injected code on an attacked node.

As used herein, a "clean node" is a node that has not been compromised by an attacker.

As used herein, a "compromised node" is a node that an attacker has gained access to.

As used herein, a "suspicious node" is a node of which it is suspected that it has been compromised by an attacker.

As used herein a "honey pot node" a node whose purpose is to lure an attacker into compromising it and to peruse it after having compromised it.

As used herein a "decoy node" is a node that pretends to perform application functionality but is isolated from the actual application.

As used herein, an "address" is a physical or virtual identifier; and includes examples such as MAC address, IP address, communication port, URI, URL, a node identifier which may also be referred to as node ID.

As used herein, a "node type" is a characteristic of a node, and may identify the node's configuration in terms of state, networking, storage, or computational capability, location, security-, scale- and fault-tolerance characteristics, hardware- or software-components, or any other temporal, structural or operational characteristics and combinations thereof.

As used herein, an "application" is an executable program that provides services to its users and that is deployed on one or more nodes. The term 'Cloud Application' is used to refer to applications deployed in a cloud setting potentially encompassing cloud infrastructures and fringes of cloud infrastructures.

As used herein, an "application node" is a node that participates in and hosts at least a portion of the application program.

As used herein, a "service" is a function of the system under consideration.

As used herein, a "resource" is a hardware or software entity providing a service within the system under consideration. Nodes, in particular, are resources.

As used herein, "communication" is an exchange of information (including, but not limited to, messages, events, datagrams, data packets, bytes, and byte streams) between two nodes (aka communication parties); this occurs by the originator of the information specifying the recipient's address (or set of recipient addresses) the information is to be sent to or exchanged with; the actual exchange can occur by a variety of technologies, including, but not limited to soft- and hardware-based communications protocols, and messaging technologies; communication below the application level occurs via platform addresses or device addresses.

As used herein, a "platform" is a collection of services provided to applications for communication, node and address management, security, resource allocation, and others; in particular, a platform provides facilities for the communication between nodes using platform addresses.

As used herein, a "topology" is a set of nodes and their configuration and relationships, including their types and ability to communicate with one another.

As used herein, a "policy" is a set of rules that define any form of decision making pertaining to the application and platform execution, including, but not limited to, application configuration, security, static and dynamic resource management, message routing and filtering, monitoring, access control, failure management, and account handling. Policy definition, modification, and tuning are supported by tools both inside and outside the application and platform code for ease of accessibility and management, while policy enforcement is an integral part of the platform.

As used herein, a "platform address" is a type of address that is potentially visible to an outside attacker, and is used by the platform to establish connections between different application nodes; an embodiment of a platform address in an IP network is the IP address of a node.

As used herein, a "device address" is a type of address that is not accessible to an outside attacker, and is used within the platform to establish connections among its services. An embodiment of a device address in an IP network is the MAC address of a node.

As used herein, a "node ID" is a type of address that is used by an application node to send one or more messages to a destination application node. The use of a node ID for communication provides a layer of abstraction from the destination node's platform address, which is subject to change. Use of the node ID for communication isolates the sending node from changes to the destination node's platform address. One embodiment of a node ID is a unique symbolic node name.

As used herein, "consistency" is a property of a system whereby information shared by certain entities of the system is identical across these entities at a given point in time. For example, a set of nodes is consistent with respect to shared state information at a given point in time, if the shared state information at each node is the same at that point in time.

As used herein, "cloaking" is a mechanism for rendering application nodes invisible, unusable, or both to nodes outside the application. This may be accomplished by changing address information about application nodes such that it is not persistently exploitable by an attacker.

As used herein, "isolation" is a mechanism by which a node is removed from the application but continues to perform application tasks in order to support forensic activities on it, the application the node is a part of, or the platform the application is running on, including, but not limited to, analysis of communication, data- or control-flow patterns, attacker activities and activity traces, or any combination thereof.

As used herein, "shadowing" is a mechanism for duplicating an existing node with a fresh, uncompromised node of the same type that has access to all the message traffic to the original node, but is augmented with additional analysis capabilities allowing detailed monitoring of the communication patterns, data- and control-flows and other metrics of the fresh node; this monitoring can be used for analysis and forensics, including, but not limited to ultimately identifying the original node as being compromised.

As used herein, the "Internet Protocol" (IP) is a communications protocol for relaying datagrams across the Internet.

As used herein, an "IP network" is a network of nodes executing the internet protocol (IP).

As used herein, an IP address is an address used to route packets to a node on an IP network. Each node on an IP network may have its own unique IP address.

As used herein, the "User Datagram Protocol" (UDP) is a communications protocol for sending and receiving datagrams between applications running on nodes implementing the IP. UDP is not a connection-oriented protocol nor does it guarantee delivery of packets via retransmission, etc.

As used herein, the "Transmission Control Protocol" (TCP) is a connection oriented communications protocol that provides reliable transfer of data between two applications; TCP is typically implemented to run over the Internet Protocol.

As used herein, a "Media Access Control address" (MAC Address) is a unique identifier assigned to network interfaces (including, but not limited to, an Ethernet or an 802.11 Wireless Network card), or network-enabled devices, for physical network communication.

As used herein, an "input device" can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch-screen.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, tablets, network PCs, minicomputers, mainframe computers, distributed computing environments that include any of the above systems or devices, and the like.

As used herein, "instructions" refer to computer-implemented steps for processing information in the system. Instructions can be implemented in software, firmware or hardware and include any type of programmed step undertaken by components of the system.

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C, C++, BASIC, or Java, and ran under a conventional operating system. C, C++, BASIC and Java are industry standard programming languages for which many commercial compilers can be used to create executable code.

A web browser comprising a web browser user interface may be used to display information (such as textual and graphical information) to a user. The web browser may comprise any type of visual display capable of displaying information received via a network. Examples of web browsers include Microsoft's Internet Explorer browser, Mozilla's Firefox browser, Google's Chrome browser, or Apple's Safari browser.

The invention disclosed herein may be implemented as a method, apparatus, or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Cloud Applications and Application Nodes

A cloud application may include one or more application nodes. In the disclosed embodiments, nodes may be provided with unique device addresses and unique platform addresses. A mapping of platform addresses to device addresses is maintained within the system. The mapping of platform addresses to device addresses may be changed in response to certain predefined conditions. This may result in at least a subset of application nodes in a cloud application obtaining different platform addresses.

Modification of a node's platform address may implicate a communication channel used to communicate with the node. For example, some implementations may utilize a stateless UDP transport. Implementations utilizing UDP may be able to communicate with a node using a new platform address without modifying the UDP parameters used for communication. Some UDP packets may be dropped when a node's platform address changes. However, since UDP connections are known to be unreliable, applications utilizing UDP should be able to gracefully recover from any UDP packets dropped as a result of a change to a platform address.

Other implementations may utilize TCP. In these implementations, modification of a node's platform address may also modify an identifier the TCP protocol uses to identify a connection with the node. In these implementations, a TCP connection that typically persists across multiple transactions may need to be shut down and restarted, such that the proper TCP connection identifiers can be established with the new platform address. Some other implementations that utilize TCP for communication may utilize on-demand TCP session establishment. In these implementations, a TCP connection using a particular platform address may only persist for a short time, for example, long enough to complete one transaction between two application nodes. If the platform address of a node changes between transactions, a transaction performed after the platform address changes will initiate a new TCP connection utilizing the new platform address. Some other implementations that utilize TCP for communication may utilize pre-handoff TCP session establishment.

In order for two nodes within a cloud application or mesh to communicate, each node must be aware of the other node's address. A node may have a variety of different types of addresses, including a device address, such as a MAC address. A device address is typically not accessible outside of the cloud application, and is therefore not accessible to an outside attacker. The device address may be used within the system to establish connections among its services.

A platform address is potentially visible to nodes outside the cloud application and therefore may be visible to an outside attacker. The platform address is used by the platform to establish connections between application nodes. In an embodiment, a platform address is an IP address.

In some embodiments, the secure computing system may change the platform address of a node. When the platform address changes, knowledge of the changed platform address may be propagated to other nodes within a cloud application, or mesh, such that communication between the nodes is not disrupted.

To facilitate communication of changes to a node's platform address, a node address or node ID to platform address mapping is provided within the system. Nodes within a cloud application may communicate with each other by specifying a node address or node ID as the destination for a message. The node ID is then mapped to a platform address before the message is sent. The platform address may also be mapped to a device address before the message is sent. Because the node ID for a particular cloud application node does not change, communication between nodes using a node ID may be unaffected when the platform address of a node changes, as the node ID is remapped to a new platform address transparently. Because the new platform address may also be mapped to the node's device address, a two level mapping from the node ID to platform address, and from platform address to device address is preserved. This ensures that the node's device address, which is ultimately used to provide connectivity between nodes of the cloud application, may be obtained from a node ID despite the changed platform address.

In some embodiments, the platform address of one or more nodes may be changed in response to detection of a security threat. For example, communication using a node's platform address may be monitored and analyzed against communication patterns known to represent security threats. If the communication patterns match, a threat may be detected. To disrupt communication between the detected threat and the node, the node's platform address may be changed. Because the threat may be communicating with the node using the node's platform address and not the node's node ID, the threat may be unable to communicate with the node after the node's platform address changes.

FIG. 1A is a system block diagram of a secure computing system implementing at least one of the disclosed embodiments. System 100 includes a cloud application 105, a user 115, and a platform 110. Outside of the system 100 is an attacker 120.

The illustrated example cloud application 105 includes one or more application nodes 130*a-c*, and a decoy node 135. The application 105 also includes a consensus state maintainer 140, a provisioner 145, a reconfigurator 150, and an analyzer 155. Application 105 further includes a consensus state 160, clean node 158, an analysis node 165, and a honey pot 170.

The consensus state maintainer 140 is configured to ensure that all nodes within the system 100 reference consistent state information. State information may include, for example, one or more address mappings. In some implementations, when an address mapping is changed, the consensus state maintainer module 140 may send notification messages to one or more nodes within system 100. In response to these notification messages, the nodes within the system 100 may retrieve updated state either directly from the address mapping within the consensus state 160 or via the consensus state maintainer 140. In some other embodiments, the consensus state maintainer 140 may implement a semaphoring or locking mechanism on the consensus state 160, for example, on the address mapping table. The semaphoring may ensure consistent address mappings for nodes of the system in some implementations.

The reconfigurator module 150 may be configured to change the platform address of one or more application nodes 130*a-c* in response to a predetermined event. Changing the platform address of one or more application nodes may prevent access to the node or nodes from threats or attacker 120 outside of the secure computing system 100. The platform 110 includes one or more services 125. The services 125 may include services to create, destroy, and manage nodes of the application 105. Services 125 may also include services to assign or change the platform address of application nodes within application 105. Services 125 may also maintain an address mapping of node IDs to platform addresses and platform addresses to device addresses. Services 125 may also include a messaging layer. The messaging layer may provide messaging services between application nodes of system 100 utilizing the consensus state 160.

The application 105 may also include a compromised node 159 that has been subject to a successful attack by attacker 120. The application may also include a known clean node 158 that has been monitored and maintained by the platform 110.

Figure 1B:
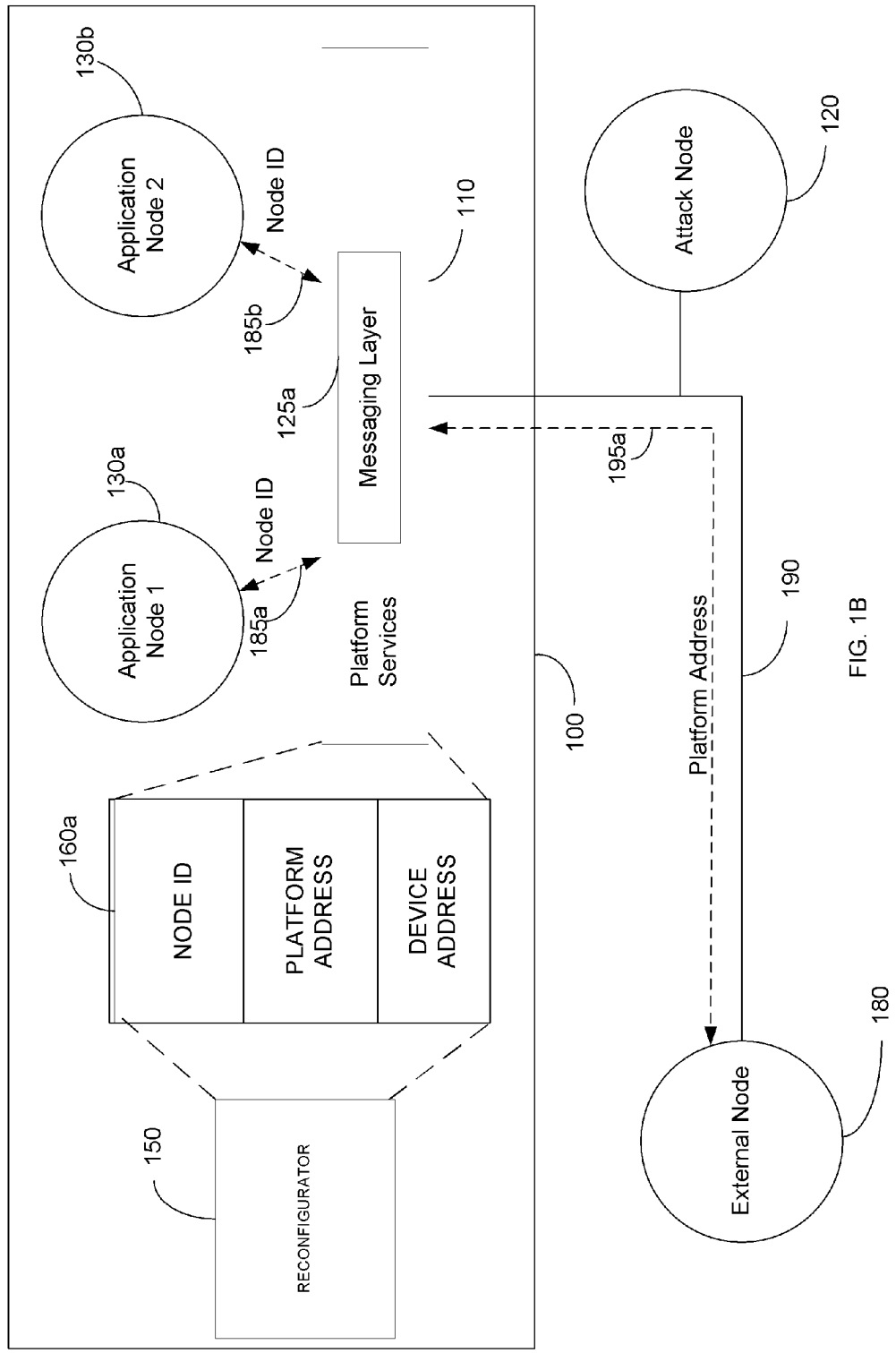
FIG. 1B is a system block diagram of a system implementing at least one of the disclosed embodiments.

FIG. 1B is a system block diagram of a secure computing system implementing at least one of the disclosed embodiments. System 100 is shown including two application nodes 130*a* and 130*b*, a reconfigurator 150, a consensus state 160*a*, and a messaging layer 125*a* within the platform services 110. Outside of system 100 are a network 190, an external node 180, and an attacker 120. Application Node 130*a* communicates with application Node 130*b* via messaging layer 125*b*. To communicate with application node 130*b*, application node 130*a* references the node ID of application node 130*b* in a send message request 185*b* to messaging layer 125*a*. Similarly, to communicate with application node 130*a*, application node 130*b* references a node ID in a send message request 185*c* to messaging layer 125*a*. Send message requests 185*a* and 185*b* shown in FIG. 1B may be implemented by the application nodes 130*a-b* calling a subroutine in the messaging layer 125*a*. Alternatively, messaging layer 125*a* may implement a web API, such as a SOAP or REST interface that allows application nodes 130*a-b* to utilize services provided by the messaging layer 125*a*.

Messaging layer 125 receives message requests 185*a* and 185*b* from application node 1 130*a* and application node 2 130*b*. Message requests 185*a* and 185*b* reference a node ID of a destination node for a message. To determine how to route the message to the destination node, messaging layer 125*a* references consensus state 160*a*. Consensus state 160*a* illustrates a simplified address mapping table including only one address mapping. In some embodiments, consensus state 160*a* would include multiple address mappings. For example, in some embodiments, consensus state 160*a* would include at least one address mapping for every application node in system 100. The address mapping shown in consensus state 160*a* (FIG. 1B) maps from a node ID to a first platform address. The consensus state 160*a* address mapping also maps from a first platform address to a device address.

To send a message based on a message request 185*a-b*, messaging layer 125 may determine a platform address based on a node ID included in the messaging request 185*a-b*. The messaging layer 125*a* may also determine a device address based on the platform address. The messaging layer 125*a* may then send a message to the destination node identified by the node ID in the messaging request based on the platform address and device address found in the consensus state 160*a*.

Application Node 130*a* or Application Node 130*b* may also communicate with external node 180 via network 190. To communicate with external node 180, Application Node 130*a*, for example, may send its first platform address in a communication stream 195*a* over network 190. In an embodiment, messaging layer 125*a* may insert the first platform address of application node 130*a* in communication stream 195*a*. Application node 130*a*'s first platform address may need to be exposed on network 190 to provide external node 180 with an ability to send messages to application node 130*a* over communication stream 195*a*. By exposing its first platform address in communication stream 195*a*, application node 130*a*'s first platform address may be discovered by attack node 120.

If attack node 120 discovers the first platform address of application node 130*a*, it may be able to communicate with application node 130*a*. The communication from attack node 120 to application node 130*a* may increase the risk that sensitive data accessible to application node 130*a* is compromised. Communication between application node 130*a* and attack node 120 may also increase the risk that Application Node 130*a* can become infected with a virus or other malicious software code.

To reduce the risk of exposing a platform address in communication stream 195*a*, reconfigurator 150 may update the consensus state 160*a*. For example, a mapping stored in consensus state 160*a* that maps from a node ID to the first platform address, and from the first platform address to a device address may be updated to utilize a second platform address instead of the first platform address. Because messaging layer 125*a* relies on consensus state 160*a* for address mappings when performing its messaging function, communication between application node 130*a* and application node 130*b* may be unaffected when the platform address of either or both application nodes is modified.

After reconfigurator 150 modifies the mapping stored in consensus state 160*a*, attack node 120 may no longer be able to communicate with application node 130*a* using the first platform address. Malicious code may not be able to discover the second platform address, and therefore may not be able to communicate with Application Node 1 130*a* any longer. Alternatively, malicious node 120*a* may need to expend additional resources, for example, processing time or computing resources, to rediscover the second platform address before it can resume communications with application node 130*a*. In some embodiments, by the time malicious code 120*a* is able to discover the second platform address, reconfigurator 160 may modify consensus state 160*a* to map the node ID of application node 130*a* to a third platform address. This may further prevent any communication from attack node 120 to application node 130*a* and preserve the security of the overall system.

Figure 2:
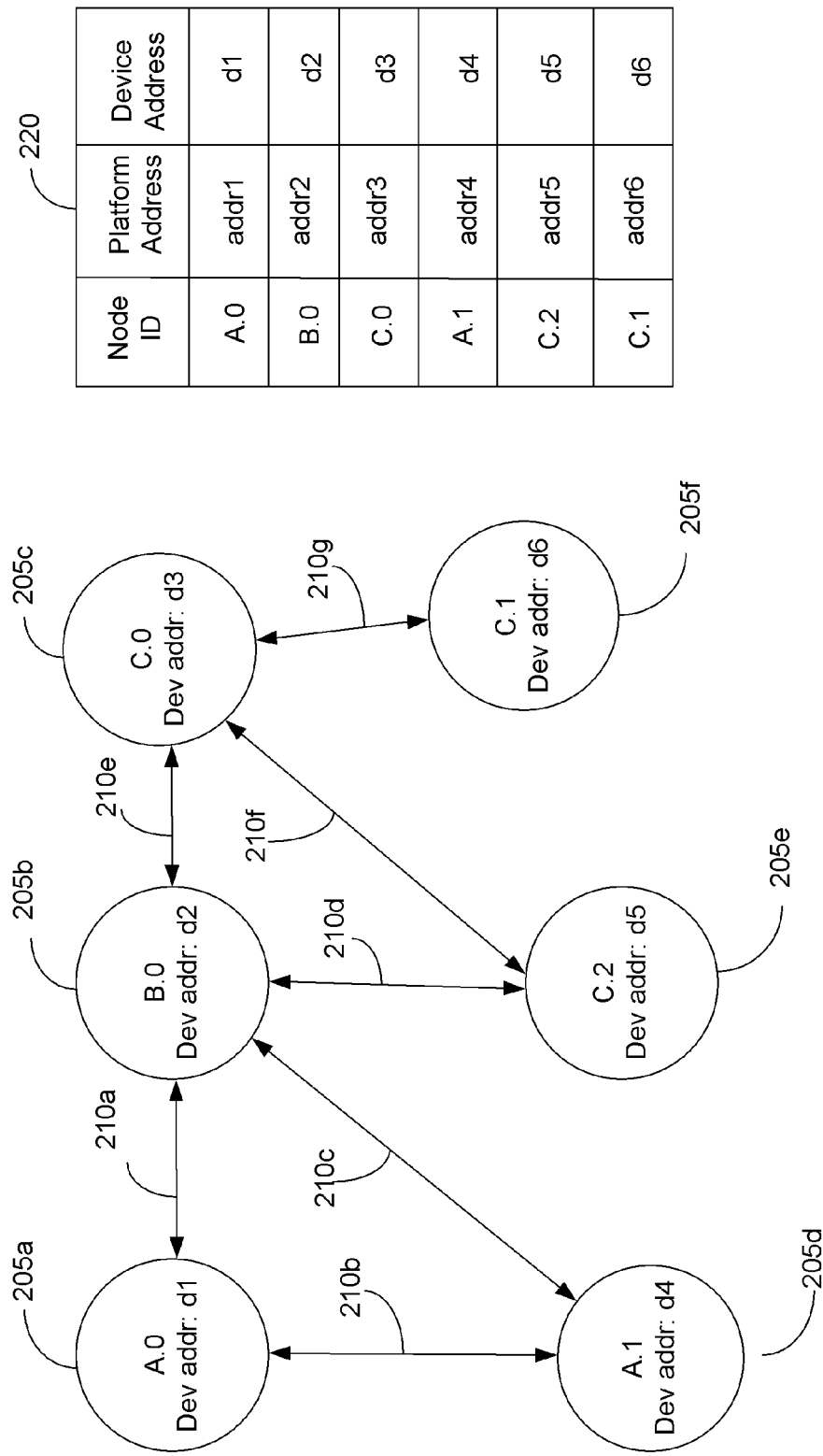
FIG. 2 illustrates one example of a cloud application including six application nodes implementing some of the present embodiments.

FIG. 2 illustrates one example of a cloud application including six application nodes 205 *a-f* implementing some of the present embodiments. Also illustrated is a consensus state 220, a mapping table that maps from node IDs to platform addresses and device addresses. The six application nodes are of three different types. The application includes two type "A" nodes, one type "B" node, and three type "C" nodes. Nodes of type "A" may be ingest notes that capture and enter information into the application, nodes of type "B" may be compute nodes that perform calculations on the application data, and nodes of type "C" may be persistence nodes that store applications data persistently.

Each of the application nodes 205*a*-*f* has a unique platform address, shown as addr1, addr2, addr3, addr4, addr5, and addr6 in consensus state 220. Each application node also has a unique device address, shown in consensus state 220 as d1, d2, d3, d4, d5, and d6 respectively. The application nodes 205*a*-*f* communicate with each other using node IDs. The node IDs are shown as A.0, B.0, C.0, C.1, A.1, and C.2 in consensus state 220. The mappings from a node ID to a platform address in consensus state 220 are used to determine the platform addresses used for node-to-node communication. For example, communication from the node with node ID B.0 to the node with node ID C.0 uses platform address addr3. Communication to the node with node ID C.2 uses platform address addr5. These platform addresses map to device addresses d3 and d5 respectively.

If an application node becomes unresponsive, crashes, or otherwise malfunctions, a reconfigurator may replace the node with a new node having a different device and platform address. When this occurs, the node ID to platform address mapping in consensus state 220 may be updated to reflect that a first node ID, which previously was mapped to a first platform address, now maps to a second platform address. A mapping of platform address to the first node's device address may also be updated to map the first node's device address to the second platform address.

Figure 3:
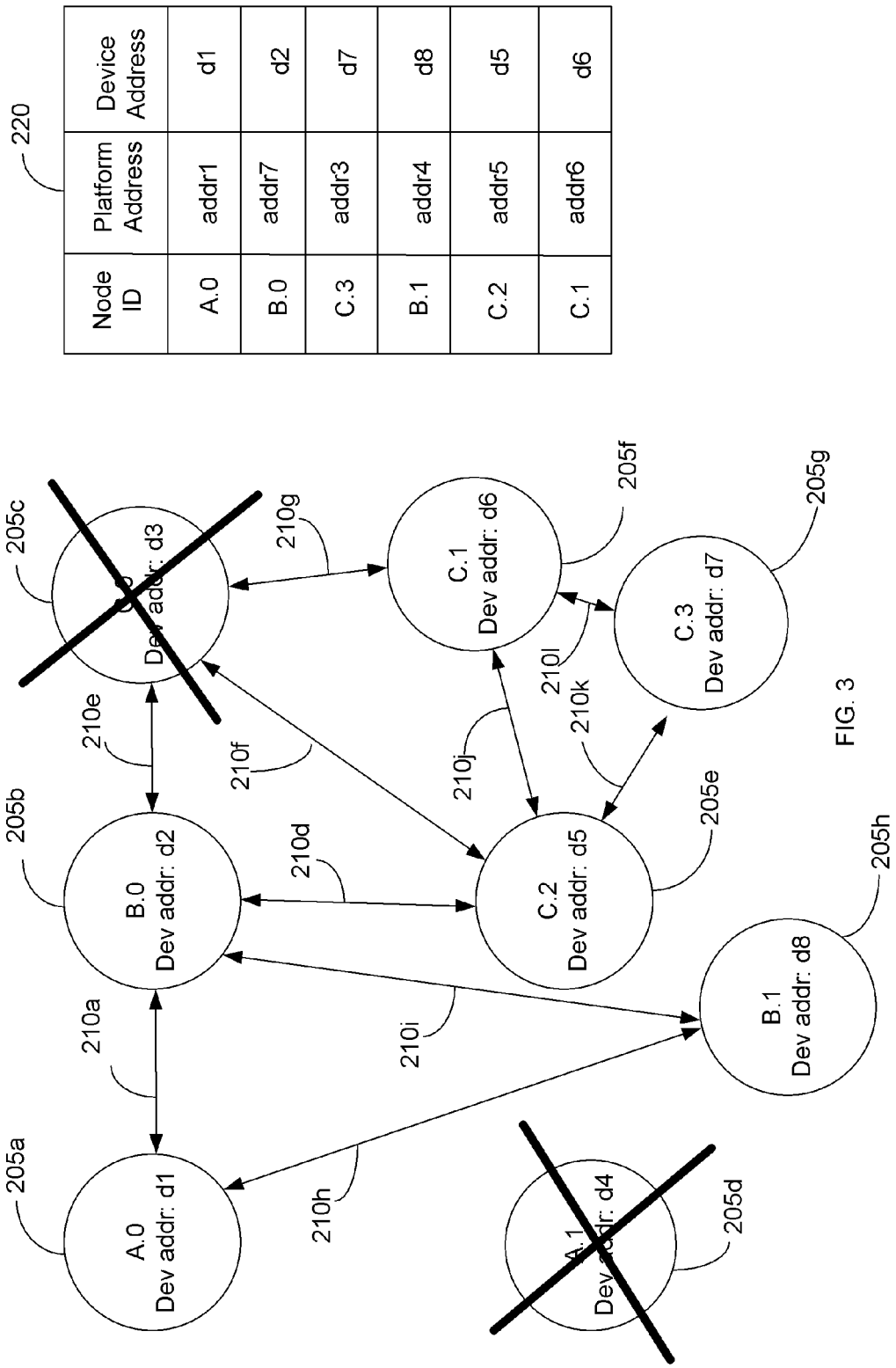
FIG. 3 shows the cloud application illustrated in FIG. 2 after the topology has changed.

FIG. 3 shows the cloud application illustrated in FIG. 2 after the topology has changed. Compared to the topology of FIG. 2, node A.1 205*d* has been eliminated, a new node B.1 205*h* has been spawned, node B.0 205*b* has changed its platform address from addr2 to addr7, and node C.0 205*c* has been replaced by node C.3 205*g*. Note that by virtue of the adjusted node address mappings, the mapping from a node's node ID to the node's device address is unchanged, despite some changes to platform address mappings. This allows communication between application nodes performed with reference to the node's node ID to continue through a topology change.

Address Mappings

As shown by consensus state 220 in FIG. 2 and FIG. 3, a mapping is maintained from a node ID to a platform address. A mapping is also maintained from a platform address to a device address. These mappings allow a device address to be determined based on a platform address or a node ID. They also allow a node ID to be determined based on a device address. A node ID may also be determined based on a platform address.

If platform addresses for a subset of nodes is changed as a result of modifications to the platform address to device address mapping, the node ID to device id mapping may remain unchanged if a compensating modification to the node ID to platform address mapping is applied. As a result, a change to a platform addresses may be transparent to an application that is communicating with nodes via node IDs by matching a change in platform address to device address mappings with a compensating change to node ID to platform address mappings. This allows communication between application nodes based on a node ID to be unaffected by the change of one or more node's platform address.

Nodes that have access to platform addresses of one or more application nodes, but not to a node ID to platform address mapping, may lose connectivity to nodes addressed by a platform addresses when a platform address for an application node changes. To regain communication, nodes communicating via a platform address may need to rediscover platform addresses of nodes with which they were communicating prior to the platform address changing. This rediscovery process may increase the cost associated with this type of communication. In some cases, the cost may be high enough to deter this type of communication generally.

Figure 4:
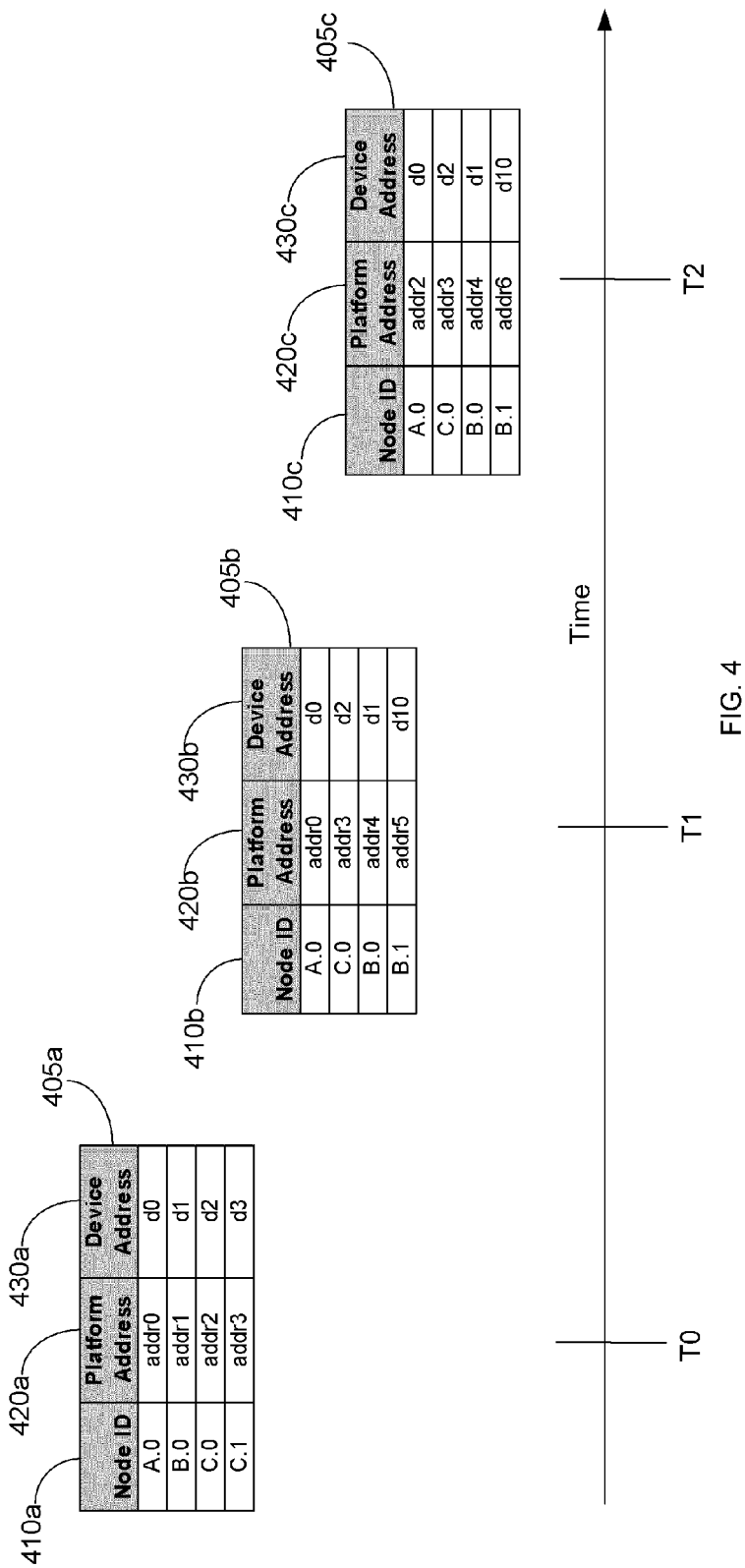
FIG. 4 shows a series of address mapping tables providing a sequence of mappings of a node ID to a platform address and of a platform address to a device address.

FIG. 4 shows how a mapping table 405 that maps node IDs to device addresses can change over three point of time. Three versions of the mapping table are shown as mapping table 405*a*, 405*b*, and 405*c*. In an embodiment, table 405*a* may exist earliest in the life of system 100, with table 405*c* existing latest in the life of system 100. Mapping table 405*b* may exist between tables 405*a* and 405*c* in time. In mapping table 405*a*, node IDs are identified in column 410*a*. A node ID may identify a particular application node in an application, for example, application nodes 130*a*-*c* of application 105. A node ID may also identify other nodes in system 100, for example, an analysis node 165, honey pot node 170, or clean node 158.

Mapping table 405*a* maps node IDs A.0, B.0, C.0, and C.1 to device addresses in column 430*a*, specifically d0, d1, d2, and d3 respectively. Mapping table 405*a* also maps node IDs in column 410*a* to platform addresses in column 420*a*. Node IDs A.0, B.0, C.0, and C.1 are mapped to platform addresses addr0, addr1, add2, and addr3 respectively.

In an embodiment, when a first application node sends a message to a second application node, the first application node references the Node ID of the application node it is communicating with. For example, in an embodiment, code of the first application node may invoke an API in a messaging layer that receives a message identifier and a node ID as parameters. A send message module in the messaging layer may receive the node ID as an input parameter. Based on the node ID, the send message module may then identify a platform address using the mapping table 405*a*. The platform address may then be used to identify a device address from mapping table 405*a*. Either the platform address, device address, or a combination of the addresses may then be utilized by the send message module to send a message to the application node identified by the node ID.

Mapping table 405*b* illustrates how the mapping from node IDs to platform addresses and device addresses may be changed during operation of the system 100. In mapping table 405*b*, the platform address of node B.0, shown in column 420*b*, with a value of "addr4" has changed relative to the platform address shown in column 420*a* of mapping table 405*a* with a value of "addr1." Mapping table 405*b* also contains a new entry for node ID B.1, illustrating how new mappings may be added to the mapping table over time.

In an embodiment, a first application node sending a message to a second application node when mapping table 405*b* is active will still reference the node ID of the second application node in column 405*b*. A send message module may then reference a new platform address shown in column 420*b*. For example, when sending a message to node B.0 during time T0, compared to time T1, a send message module may reference platform address "addr1" using table 405*a* during time T0, and reference platform address "addr4" using table 405*b* during time T1.

At time T2, a third version of the mapping table 405c is active. Mapping table 405c illustrates that the platform address of node ID A.0, shown in column 420c, is changed relative to the platform address of node ID A.0 shown in column 420b of table 405b. An application node sending a message to node A.0 during time T1 may use the same node ID A.0 when sending a message to the second application node during time T2. However, the send message module may reference a different platform address, for example, platform address "addr2" may be referenced for node ID A.0 during time T2. Platform address "addr 0" may be referenced to send a message to node ID A.0 during time T1.

Consensus State

The application maintains knowledge about the application structure and application state that is key to keeping the application internally coherent, as well as to breaking external access to application nodes. This knowledge is shared and agreed upon across all application nodes in the form of a Consensus State that is not revealed nodes outside the application.

Figure 5:
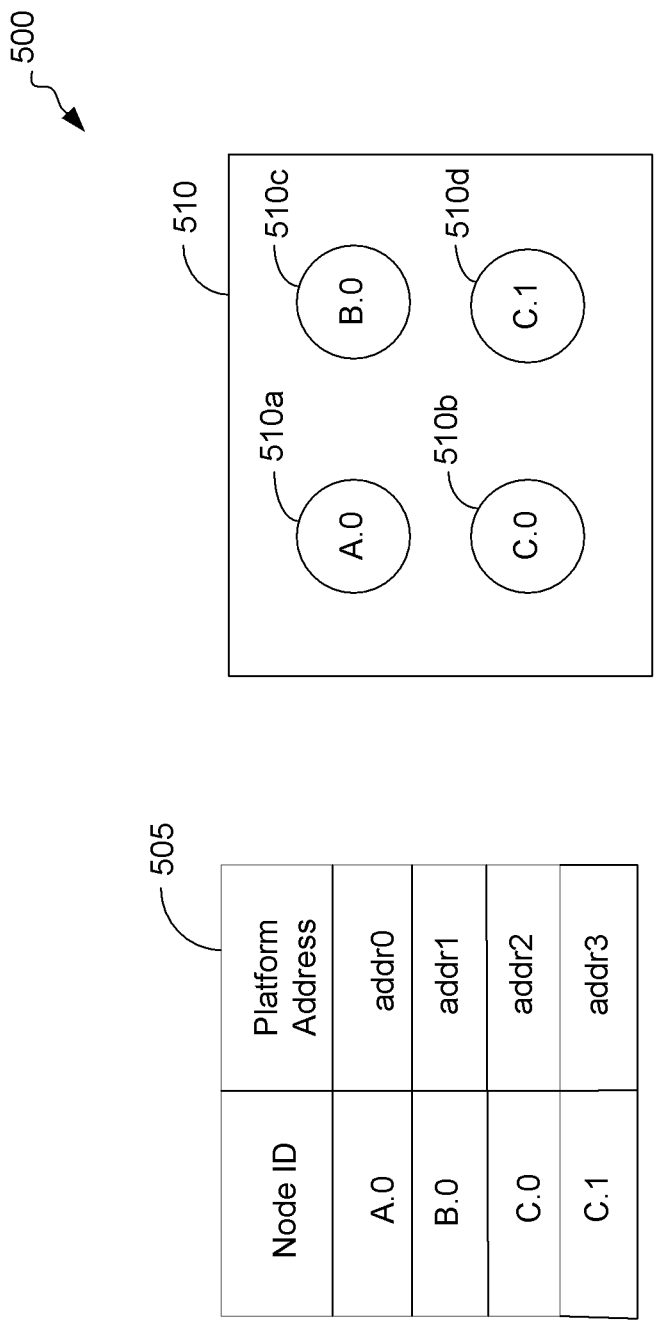
FIG. 5 shows a consensus state containing a node ID to platform address mapping, and a record of clean node states.

FIG. 5 illustrates information included in one embodiment of a Consensus State 500. The illustrated embodiment of a consensus state 500 includes a node ID to platform address mapping 505 and a collection of clean node states 510. The node ID→platform address mapping 505 tracks the application topology as explained above with reference to FIG. 4. The collection of clean node states 510 may be used to duplicate or restart nodes in an uncompromised or clean state. The clean node states 510a-d may be used for duplication (for example, for decoy, quarantining, or analysis purposes), clean up (for example, to handle compromised node state), or restart of nodes (for example, after a node failure).

Changes to the consensus state 500 are made visible to all application nodes in a consistent fashion. If the address mappings of table 505 are changed, the changes are propagated to a set of application nodes, such that those nodes may continue to communicate properly. Changes to the address mappings of table 505 are not provided to entities external to an application. If an entity external to the application was able to obtain a particular version of address mapping 505, the version obtained may become stale and unusable when the mappings of table 505 are updated. In some embodiments, consensus state is implemented via the Paxos algorithm as described in U.S. Patent Publication 20090150566 hereby incorporated by reference in its entirety, or one of its derivatives.

As discussed above, FIG. 1A illustrates a reconfigurator 150, a provisioner 145, an analyzer 155, and a consensus state maintainer 140. The reconfigurator 150 manages updates to an application topology 105. The analyzer 155 provides input to the reconfigurator 150 on application reconfiguration or clean-up activities. The provisioner 145 creates new or duplicate nodes when needed, and the consensus state maintainer 140 maintains a shared state to ensure it is consistent within the application and unusable by entities outside the application. Each of the reconfigurator 150, provisioner 145, analyzer 155, and consensus state maintainer 140 are discussed in more detail below.

Reconfigurator

The reconfigurator 150 performs updates to platform addresses of application nodes identified in a mapping table to ensure address information about the application nodes is not persistently exploitable by an attacker. In an embodiment, to update the platform addresses, the reconfigurator may rotate the platform addresses in a mapping table. For example, an update may transition addresses from a first position in a map to a second position in the map.

In some embodiments, updating an address may include proposing a modified mapping to the consensus state maintainer 140, achieving consensus on the changed address, and then atomically switching to the agreed upon new address map and actually changing platform addresses. In an embodiment, achieving consensus may include sending synchronization messages to any nodes utilizing the consensus state. Achieving consensus may also include waiting for notification from each of the nodes utilizing the consensus state that the synchronization message was processed.

In some embodiments, the reconfigurator 150 will perform address updates at fixed time intervals, such as every millisecond, or every 10 milliseconds, or every 100 milliseconds, or every second, or every 10 seconds, or every minute, or every hour, or every day, or every week, or at shorter or longer time intervals, or at any combination thereof.

In some embodiments, the reconfigurator 150 will perform address updates at random time intervals with a uniform time distribution over the range from 0 to 100 milliseconds, or over the range from 0 to 1 second, or over the range from 0 to 10 seconds, or using some other distributions including, but not limited to, normal, Poisson, exponential, geometric distributions, or using shorter or longer time ranges or any combination thereof.

In some embodiments, the reconfigurator 150 will perform address updates based on analytics about the state of the overall system. For example, address updates may be based on messages or message sequences received or processed, communication pathways existing or not existing, data stored or processed, computations performed, locations of nodes, or any other relevant metrics about the system and its health.

In some embodiments, address changes may occur at individual application nodes independently, without requiring coordination with other application nodes. This may reduce communication overhead within the application 680. This may also reduce the exposure of address update coordination messages to statistical or other forms of attack by a malicious party. This may also increase the performance of the application by reducing overhead resulting from address updates. In an embodiment, the reconfigurator 150 may provide application nodes and platform services with parameters to coordinate the independent address updates. The reconfigurator 150 may be implemented using a subset of application nodes from the application topology 105.

Analyzer

The analyzer module 155 may be implemented using some subset of application nodes. The analyzer 155 may perform ongoing analysis on application nodes 130a-c or the system's overall topology to detect compromised application nodes. The analyzer 155 may also initiate clean-up activities in response to detecting the compromised node or nodes. The analyzer may also trigger the isolation, restart, or duplication of nodes 130a-c. These activities may be guided by application defined policies by forwarding respective requests to the provisioner 145.

Analysis is performed in various forms, including traffic analysis on messages and pattern analysis of node state changes to trigger the creation of deep analysis (communication patterns, attack fingerprints), shadowing, and quarantining of nodes. In some embodiments, the analyzer 155 uses machine learning techniques such as supervised or unsupervised learning, or combinations thereof.

In some embodiments, the analyzer 155 will utilize separate platform or third-party specifications, processing, analysis and metrics, and libraries of attack patterns, including, but not limited to, message patterns, application traces, key metrics extraction and sampling, control- and data-flow patterns, data queries, stored and processed data.

In some embodiments, the analyzer 155 will contribute to internal or third-party libraries by storing or supplying (or any combination thereof) attack fingerprints, including, but not limited to message patterns, application traces, key metrics extraction and sampling, control- and data-flow patterns, data queries, stored and processed data.

In some embodiments, the analyzer 155 will monitor message traffic and trigger address rotation or node cleanup based on the volume of observed messages in such a way that address rotation or node modification occurs before enough messages have been sent to allow for exploitation of messages by statistical analysis or attacks.

Provisioner

The provisioner 145 may be implemented using some subset of application nodes and manages or supports the life cycle of nodes. The provisioner 145 may start new instances of application nodes, or delete or reconfigure application nodes. The provisioner 145 may take these actions in response to input from the analyzer 155.

The provisioner 145 may create new application nodes from existing application nodes, or reset nodes to a well-defined and trusted state. The consensus state may maintain a "clean node state" that is used by the provisioner 145 to reset a node.

In some embodiments, nodes identified by the analyzer 155 are reset to known trusted and uncompromised states based on information provided by the consensus state maintainer 640.

In some embodiments, nodes are isolated, shadowed, duplicated, or any combination thereof, for the purpose of aiding uncompromised application execution and enhancing analysis capabilities, including but not limited to protecting the application from suspicious nodes, allowing nodes to take themselves out of the application based on their own internal analysis while assuring provisioning of sufficient node resources to ensure continued application execution, enabling differential analysis between existing, possibly compromised, and known clean duplicated nodes, and deep analysis of nodes via providing explicit processing resources via shadow nodes in addition to the original node's capabilities.

In some embodiments, nodes determined to be suspicious may be isolated and maintained as honey pots. These suspicious nodes may serve as targets of an attack. In some embodiments, the provisioner 145 may provide duplicate and isolated application nodes as decoys to reduce the likelihood of an attack compromising an uncompromised application node.

Consensus State Maintainer

At least a subset of nodes participates in maintaining agreement on a consensus state. In some embodiments, the consensus state is maintained in a central node, which may be accessible to a portion or all of the application nodes. In some embodiments, the consensus state may be maintained by a group of nodes. In these embodiments, a subset of application nodes may have access to subsets of the nodes maintaining the consensus state. In some embodiments, there is a 1-1 mapping between application nodes and nodes maintaining the consensus state.

The consensus state maintainer 160 may establish the consistent consensus state. In some embodiments, the consensus state maintainer is protected by means of cryptographic measures, including, but not limited to, cryptographically signed transactions on its consensus state, cryptographically encrypted consensus state, and multi-level authentication for accessing consensus state, or any combinations thereof. In some embodiments, communication with the state maintainer is logged for auditing purposes. In some embodiments, the consensus state maintainer is guarded by role-based access protocols, including, but not limited to access control lists. In some embodiments, the consensus state maintainer is guarded by dedicated shadow nodes.

In some embodiments, the consensus state maintainer 160 uses consensus-building algorithms, such as the Paxos protocol (See U.S. Patent Publication US2009/0150566).

These methods outlined above may reduce the exposure of the consensus state maintainer nodes, making it more difficult for an attacker to compromise the consensus state.

In some embodiments, information about the topology and the consensus state is communicated incrementally among nodes. Incremental updates to the consensus state may make it more difficult for an attacker to reconstruct the topology of an application. Address changes initiated by the reconfigurator 150 may compound the difficulty. In some embodiments, information about the topology and the consensus state is communicated in encrypted form.

In some embodiments, information about the topology and the Consensus State is augmented by filler messages that may not contain topology or Consensus State information. These messages add to message traffic and change the distribution and form of observable messages. This may render statistical analysis of traffic by an attacker more complex and less successful.

Method of Reducing Vulnerability of Application Nodes

Figure 6:
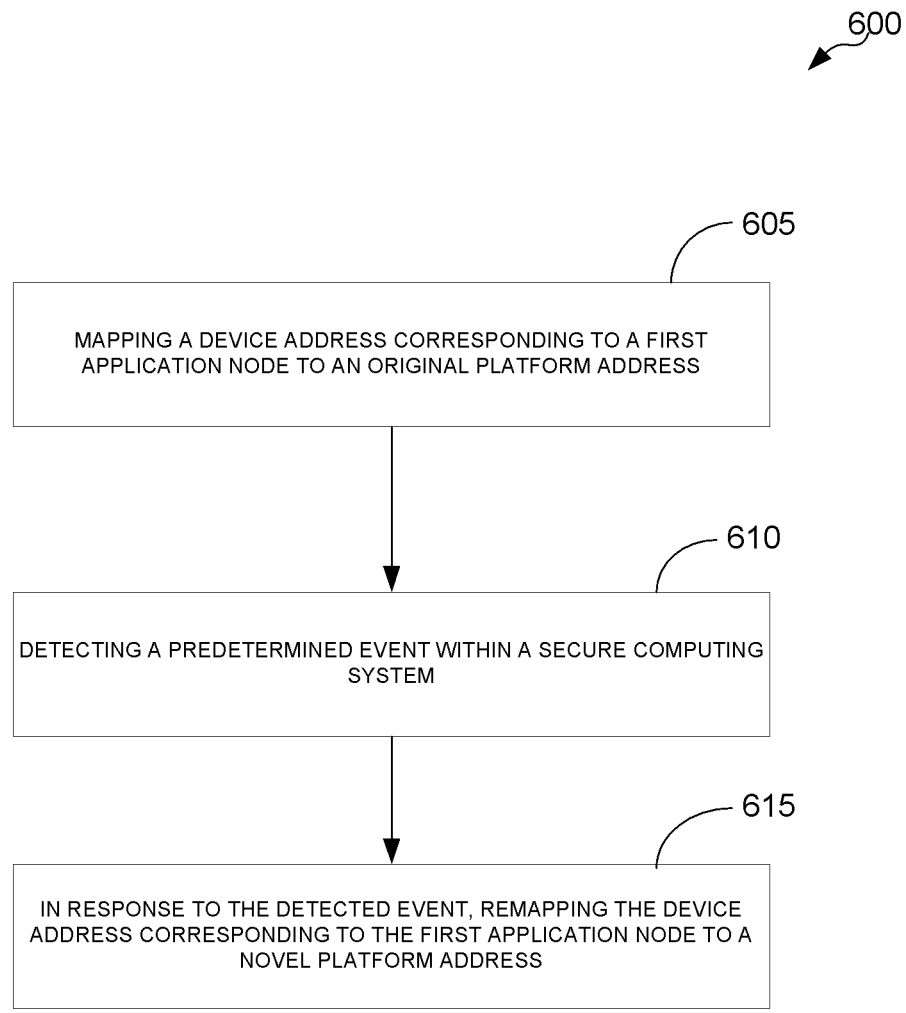
FIG. 6 shows a flow diagram of one method of remapping a device address.

FIG. 6 is a flowchart of a method of reducing the vulnerability of a plurality of application nodes to an attack. Process 600 may be performed in the secure computing system 100 illustrated in FIG. 1. In block 605 a device address corresponding to a first application node is mapped to an original platform address. In an embodiment, the platform address may be mapped to a node ID.

In an embodiment, a message may then be sent to the first application node based on the node ID. For example, when a second application node in a secure computing system communicates with the first application node, the second application node may provide or reference a node ID corresponding to the first application node with which they are communicating. The secure computing system may then obtain a platform address based on the provided node ID. The obtained platform address may be the original platform address. The original platform address may then be used to obtain a device address of the first application node. One or more network messages may then be exchanged with the second application node based on the device address.

Note that while the discussion above references a second application node obtaining platform and device addresses, one with skill in the art would recognize that these functions may be performed by other portions of the secure computing system 100. For example, the secure computing system 100 may include a messaging layer. Application nodes may rely on the messaging layer to resolve device addresses based on node IDs. The messaging layer may also manage ensuring consistent address information during a platform address change, as discussed below.

In block 610, a predetermined event within a secure computing system is detected. For example, communication with one or more application nodes in the secure computing system may be monitored and compared with communication patterns of known threats. If a match is detected, an event may be detected. In an embodiment, the predetermined event may be the detection of a network threat from a computer attacker external to a secure computing system.

For example, a denial of service attack may be detected in block 610. In an embodiment, the volume or type of communication being sent to one or more application nodes in the secure computing system may be monitored. If the volume of traffic exceeds a predetermined threshold, a denial of service attack may be detected. In an embodiment, block 610 is performed by the analyzer module, discussed below with reference to FIG. 7.

In an embodiment, the event detected in block 610 can be the passage of a predetermined amount of time. For example, a secure computing system may be configured to change the platform addresses of one or more application nodes periodically, for example, every hundredth of a second, every second, every minute, or every five (5) minutes. In an embodiment, block 610 is performed by the timer module 736, discussed below with reference to FIG. 7.

In block 615, the device address corresponding to the second application node is remapped from the original platform address to a novel platform address. The remapping occurs in response to the event detected in block 610. In an embodiment, the node ID of the second application node discussed above may also be remapped to the novel platform address.

After the device address is remapped, the second application node discussed above may again communicate with the first application node using the node ID of the first application node. As part of communicating with the first application node, the node ID used by the second application node to reference the first application node may be used to obtain a platform address. In an embodiment, the obtained platform address is the novel platform address. The novel platform address may then be used to obtain a device address of the first application node. The obtained device address may then be used to communicate with the first application node.

Figure 7:
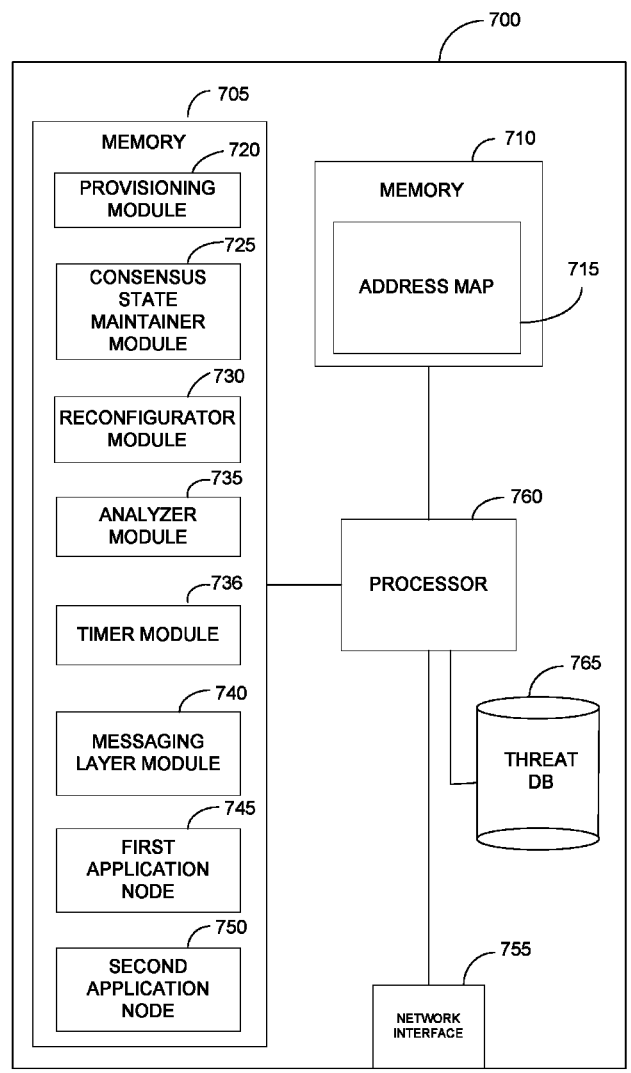
FIG. 7 illustrates a security enhanced system containing series of modules according to one embodiment of the invention.

FIG. 7 is a block diagram of one example of an apparatus implementing a secure computing system. Apparatus 700 includes a processor 760, a memory 710, a memory 705, a threat database 765, and a network interface 755. Memory 705 stores several modules that include instructions that configure processor 760 to perform functions of the secure computing system.

Memory 705 stores a first application node 745 and a second application node 750. The application nodes include instructions that configure processor 760 to perform application level functions. For example, the first application node 745 may include instructions that configure processor 760 to send a message to the second application node 750. The first application node 745 may send a message by specifying a node ID of the second application node 750.

Memory 705 stores a provisioning module 720. The provisioning module 720 includes instructions that configure processor 760 to start or stop one or more application nodes, for example, first application node 745 and second application node 750 may be started or shutdown by instructions in the provisioning module 720. As part of provisioning an application node, provisioning module 720 may assign an initial node ID and an initial or original platform address to the application node. Provisioning module 720 may then record an association between the node ID and the platform address to the address map 715. The application node will also have a device address. Provisioning module 720 may also record an association between the initial or original platform address and the application node's device address in the address map 715. Therefore, instructions included in the provisioning module 720 may represent one means for mapping a device address corresponding to a first application node to an original platform address.

Memory 705 stores a consensus state maintainer module 725 that includes instructions that configure processor 760 to ensure consistent state data is utilized by components of the secure computing system. For example, the consensus state maintainer module 725 may ensure that a consistent version of the address map 715 is utilized by the first application node 745 and the second application node 750.

Memory 705 stores a reconfigurator module 730 that includes instructions that configure processor 760 to change a platform address of an application node, for example, first application node 745 or second application node 750 in response to an event. In an embodiment, the event may be detected by an analyzer module 735. In another embodiment, an event may be detected by a timer module 736.

When an event is detected, the reconfigurator module 730 may change the platform address of an application node by updating data stored in address map 715. For example, address map 715 may include a first set of mappings that map from one or more node IDs to one or more corresponding platform addresses. Address map 715 may further include a second set of mappings that map from one or more platform addresses to one or more corresponding device addresses. As described above, the first and second set of mappings can be combined to map from a node ID to a device address. The reconfigurator may change a mapping of a node ID identifying a first application node from a first platform address to a changed platform address. To ensure the node ID to device address mapping remains unchanged, the reconfigurator module 730 may update a platform address to device address mapping to map from the changed platform address to the first device address.

Therefore, instructions in the reconfigurator module 730 may represent one means for remapping a device address corresponding to a first application node to a changed platform address in response to a detected event. Instructions in the reconfigurator module 730 may also represent one means for mapping a device address corresponding to an application node to a platform address.

Memory 705 stores an analyzer module 735 that includes instructions that configure processor 760 to analyze communication traffic patterns of at least the first application node 745 and second application node 750. Analyzer module 735 may detect one or more events based on its analysis.

In an embodiment, device 700 may maintain or have access to a database 865 that stores parameters defining communication patterns identifying particular events. The parameters may include a particular message format or contents that identify a threat. For example, some viruses may be transferred in messages that include a particular sequence or pattern of data. This pattern may be stored in threat database 765 and used by analyzer module 735 to detect an event. The parameters stored in threat database 765 may also include a number of messages or a destination or source address or port number that identifies a threat. For example, a pattern indicating a large number of messages to a particular destination may indicate a denial of service attack.

A pattern of messages attempting to "login" or otherwise gain authorization to the first application node 745 or second application node 750 may indicate malicious activity. Such a pattern of login messages may be stored in the threat database 765. For example, threat database 765 may include a record that associations a description of a message, and a maximum number of transmissions of the message that should occur within a time period. If the maximum number of transmissions is exceeded, the analyzer module may detect an event. As another example, the threat database 765 may store a maximum number or type of messages that should be received from a particular source address within a time period. If the maximum number of messages is exceeded, the analyzer module may determine a denial of service attack event has occurred based on the threat database 765. Therefore, instructions in the analyzer module 735 may represent one means of detecting a predetermined event within a secure computing system. Instructions in the analyzer module 735 may also represent one means for determining a network threat event from a computer attacker external to a secure computing system.

In another embodiment, a detected event may be the passage of a predetermined period of time. A timer module 736 includes instructions that configure processor 760 to detect an event based on a passage of time. For example, in an embodiment, the timer module may be configured to send an event to the reconfigurator module every 15, seconds, 60, or 120 seconds. Therefore, instructions in the timer module 736 may represent one means for detecting a predetermined event within a secure computing system.

Memory 705 also stores a messaging layer 740. Messaging layer 740 includes instructions that configure processor 760 to send messages. The messages may be sent in response to subroutines or other API's invoked by one or more application nodes. The subroutines or API's may receive a destination node ID and a message identifier as input parameters.

Messages sent by messaging layer 740 may include messages sent between two or more application nodes. For example, instructions in messaging layer 740 may configure processor 760 to send a message from the first application node 745 to the second application node 750. Messaging layer 740 may also enable the sending of messages between an application node and an external node, for example, external node 180 illustrated in FIG. 1B.

Instructions in messaging layer 740 may reference address map 715 when sending messages. For example, as discussed above, a subroutine or other API may be invoked by an application node, with the node ID for a destination application node as an input parameter. A message identifier, such as a pointer to a message or an object identifying a message may also be passed as an input parameter to the messaging layer 840. Messaging layer 740 may then map from the node ID in the message request to a first platform address and a first device address stored in address map 715. Therefore, instructions in the messaging layer 740 represent one means for mapping a device address corresponding to a first application node to an original platform address.

As discussed above, the secure computing system 100 or 700 may be run across multiple physical devices or servers, with each device or server hosting one of more of the described modules and still be within the spirit of embodiments of this invention. For example, the first application node 745 and the second application node 750 may be running on a different server, or instance of a server, than the provisioning module 720 and reconfigurator module 730. In addition, each server may utilize multicore or multiple processors, wherein each node or module of the system runs on a different core or processor.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method in a secure computing system of reducing the vulnerability of an application node to attack, wherein the node has a platform address and a device address, comprising:

mapping a device address corresponding to a first application node to a first platform address;

mapping the first platform address to a first node identifier;

detecting a predetermined event within the secure computing system;

in response to the detected event, remapping the device address corresponding to the first application node to a second platform address and remapping the first node identifier to the second platform address;

securely synchronizing the remappings between at least two application nodes;

receiving a request to communicate a message, the request specifying the first node identifier as a destination for the message;

in response to the request, determining a second device address based on the remapped first node identifier, and communicating with an application node corresponding to the first node identifier based on the second device address.

2. The method of claim 1, wherein the predetermined event is a network threat from a computer attacker external to the secure computing system.

3. The method of claim 1, further comprising determining a second platform address based on the first node identifier, and wherein communicating with the destination comprises transmitting the second platform address over a computer network, and wherein the address mappings are unusable by unauthorized entities.

4. The method of claim 1, wherein the mapping is carried out by updating an address mapping table.

5. The method of claim 4, wherein authorized users of the secure computing system have access to the address mapping table and are connected to the first application node in response to the predetermined event by mapping the first node identifier to the second platform address and mapping the second platform address to the second device address.

6. A secure computing system, comprising
a plurality of nodes running applications, wherein each node has a device address a platform address, and a node identifier;
one or more address tables configured to store a mapping of the node identifier to the platform address, and the platform address and to the device address;
a reconfigurator module capable of changing the mappings for one or more nodes in response to a predetermined event;
a consensus state module, configured to securely synchronize the address mappings between the plurality of nodes in response to the change; and
a first node of the plurality of nodes configured to communicate with a second node of the plurality of nodes based on the securely synchronized address mappings.

7. The system of claim 6, wherein the first node is configured to communicate a message to the second node by mapping from the node identifier of the second node to a platform address of the second node, and transmitting the message to the second node over a communications network, the message including the platform address.

8. The system of claim 7, wherein the first node is configured to not include the node identifier of the second node in the message.

9. The system of claim 6, further comprising a messaging layer module, configured to receive a message from the first node and determine how to route the message to the second node based on the one or more address tables.

10. The system of claim 6, wherein the reconfigurator module is configured to change the platform address of the one or more nodes in response to detecting an attack on the system.

11. The system of claim 6, further comprising a consensus state maintainer module configured to ensure consistent address mappings are used by the plurality of nodes.

12. The system of claim 6, wherein system comprises honey pot nodes configured to attract and monitor an attacker.

13. The system of claim 6, wherein the system comprises a provisioner module that is configured to add or remove nodes from the system in response to predetermined events.

14. The system of claim 6, further comprising an Analyzer module configured to monitor the plurality of nodes to detect attack patterns or flag predetermined application activities.

15. A secure computing apparatus for reducing the vulnerability of a plurality of application nodes to attack, wherein each node has a platform address and a device address, comprising:
   means for mapping a device address corresponding to a first application node to a first platform address;
   means for mapping a node identifier corresponding to the first application node to the first platform address;
   means for detecting a predetermined event within the secure computing system;
   means for remapping the device address corresponding to the first application node to a second platform address and for remapping the node identifier to the second platform address in response to the detected event;
   means for securely synchronizing the mappings between the plurality of application nodes in response to a remapping; and
   means for communicating with the first application node based on the securely synchronized mappings.

16. The apparatus of claim 15, further comprising means for detecting a threat from a computer attacker external to the secure computing system.

17. The apparatus of claim 15, means for detecting an event after a predetermined amount of time.

18. The apparatus of claim 15, wherein the means for mapping is configured to update an address mapping table to map the device address corresponding to a first application node to the first platform address.

19. A non-transitory, computer readable medium comprising instructions that when executed cause a processor to perform a method in a secure computing system of reducing the vulnerability of an application node to attack, the method comprising:
   mapping a device address corresponding to a first application node to a first platform address;
   mapping the first platform address to a first node identifier;
   detecting a predetermined event within a secure computing system;
   in response to the detected event, remapping the device address corresponding to the first application node to a second platform address and remapping the first node identifier to the second platform address;
   securely synchronizing the remappings between at least two application nodes;
   receiving a request to communicate a message, the request specifying the first node identifier as a destination for the message;
   determining a second device address based on the first node identifier, and
   communicating with the destination based on the second device address.

20. The non-transitory computer readable medium of claim 19, wherein the predetermined event is a network threat from a computer attacker external to the secure computing system.

21. The non-transitory computer readable medium of claim 19, wherein the predetermined event is the passage of a predetermined amount of time.

22. The non-transitory computer readable medium of claim 19, wherein the mapping is carried out by updating an address mapping table.

23. The method of claim 1, further comprising communicating with the application node corresponding to the first node identifier based on the first node identifier both before and after the remappings.

24. A secure communications system, comprising:
   a plurality of nodes running applications, wherein each node has a device address, a platform address, and a node identifier;
   an insecure internode communications subsystem, configured to communicate messages between the nodes based on the platform addresses;
   a secure data synchronization subsystem, configured to securely synchronize mappings of node identifiers to platform addresses between the plurality of nodes;
   a reconfigurator module capable of changing the platform address for one or more nodes in response to an event, wherein the secure data synchronization subsystem is configured to resynchronize the mappings of node identifiers to platform addresses between the nodes in response to the change; and
   an application layer messaging subsystem, configured to:
      receive a request to send a message based on a node identifier of a destination node,
      map from the node identifier of the destination node to a platform address of the destination node based on the securely synchronized mappings, and
      utilize the insecure intranode communications subsystem to transmit the message to the destination node, the message comprising the platform address.

25. The system of claim 24, further comprising:
a first application program running on a first node;
a second application program running on a second node,
wherein the first application is configured to communicate with the second application by specifying a node identifier of the second application as a destination for a message.

* * * * *